United States Patent
Xu et al.

(10) Patent No.: US 11,595,987 B2
(45) Date of Patent: Feb. 28, 2023

(54) TECHNIQUES FOR PHYSICAL DOWNLINK CONTROL CHANNEL (PDCCH) LIMITS FOR MULTIPLE CELLS SCHEDULING ONE CELL IN A WIRELESS COMMUNICATION SYSTEM

(71) Applicant: QUALCOMM Incorporated, San Diego, CA (US)

(72) Inventors: Huilin Xu, San Diego, CA (US); Seyedkianoush Hosseini, San Diego, CA (US); Hung Dinh Ly, San Diego, CA (US); Jing Lei, San Diego, CA (US); Wanshi Chen, San Diego, CA (US); Peter Pui Lok Ang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/141,995

(22) Filed: Jan. 5, 2021

(65) Prior Publication Data
US 2021/0227569 A1    Jul. 22, 2021

Related U.S. Application Data

(60) Provisional application No. 62/964,499, filed on Jan. 22, 2020.

(51) Int. Cl.
*H04W 72/12* (2009.01)
*H04W 24/08* (2009.01)
(Continued)

(52) U.S. Cl.
CPC ....... *H04W 72/1289* (2013.01); *H04L 1/0038* (2013.01); *H04W 24/08* (2013.01);
(Continued)

(58) Field of Classification Search
CPC .......... H04W 72/0446; H04W 72/042; H04W 72/1289; H04W 24/08; H04W 76/11; H04L 1/0038
(Continued)

(56) References Cited

U.S. PATENT DOCUMENTS

2019/0246409 A1*    8/2019    Kim ................. H04B 7/0626

OTHER PUBLICATIONS

Ericsson: "Dynamic Spectrum Sharing in Rel-17", 3GPP Draft, RP-191052 Dynamic Spectrum Sharing in REL-17, 3rd Generation Partnership Project (3GPP), Mobile Competence Centre; 650, Route Des Lucioles; F-06921, Sophia-Antipolis Cedex; France, vol. TSG RAN, No. Newport Beach, CA, USA; Jun. 3, 2019-Jun. 6, 2019, Jun. 2, 2019 (Jun. 2, 2019), XP051747266, 6 pages, Retrieved from the Internet: URL: http://www.3gpp.org/ftp/Meetings%5F3GPP%5FSYNC/RAN/Docs/RP%2D191052%2Ezip [retrieved on Jun. 2, 2019] slides 3,4.

(Continued)

*Primary Examiner* — Peter G Solinsky
(74) *Attorney, Agent, or Firm* — Arent Fox, LLP

(57) ABSTRACT

Aspects described herein relate to determining a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell, and communicating one or more PDCCH transmissions for the first cell from the second cell and the at least a third cell based on the PDCCH limit.

30 Claims, 9 Drawing Sheets

(51) Int. Cl.
    *H04W 76/11*      (2018.01)
    *H04W 72/04*      (2009.01)
    *H04L 1/00*       (2006.01)
    *H04W 72/0446*    (2023.01)

(52) U.S. Cl.
    CPC ..... *H04W 72/042* (2013.01); *H04W 72/0446* (2013.01); *H04W 76/11* (2018.02)

(58) Field of Classification Search
    USPC ........................................................ 370/329
    See application file for complete search history.

(56) References Cited

OTHER PUBLICATIONS

International Search Report and Written Opinion—PCT/US2021/012349—ISA/EPO—dated Apr. 20, 2021.

"3rd Generation Partnership Project, Technical Specification Group Radio Access Network, NR, Physical Layer Procedures for Control (Release 15)", 3GPP Standard, Technical Specification, 3GPP TS 38.213, 3rd Generation Partnership Project (3GPP), Mobile Competence Centre, 650, Route Des Lucioles, F-06921, Sophia-Antipolis Cedex, France, vol. Ran WG1, No. V15.8.0, (Dec. 2019), Jan. 11, 2020, pp. 1-109, XP051860646, chapter 10.

Intel Corporation: "On Support of Cross-Carrier Scheduling with Different Numerologies", 3GPP Draft, 3GPP TSG-RAN WG1 #96, R1-1902518, 3rd Generation Partnership Project (3GPP), Mobile Competence Centre; 650, Route Des Lucioles; F-06921, Sophia-Antipolis Cedex; France, vol. Ran WG1, No. Athens, Greece; Feb. 25, 2019-Mar. 1, 2019, Feb. 16, 2019 (Feb. 16, 2019), XP051600214, 4 pages, chapters 1,2.

\* cited by examiner

TECHNIQUES FOR PHYSICAL DOWNLINK CONTROL CHANNEL (PDCCH) LIMITS FOR MULTIPLE CELLS SCHEDULING ONE CELL IN A WIRELESS COMMUNICATION SYSTEM

CROSS-REFERENCE TO RELATED APPLICATION(S)

This application claims the benefit of U.S. Provisional Application Ser. No. 62/964,499, entitled "TECHNIQUES FOR PHYSICAL DOWNLINK CONTROL CHANNEL (PDCCH) LIMITS FOR MULTIPLE CELLS SCHEDULING ONE CELL IN A WIRELESS COMMUNICATION SYSTEM" and filed on Jan. 22, 2020, which is expressly incorporated by reference herein in its entirety.

BACKGROUND

Aspects of the present disclosure relate generally to wireless communication systems, and more particularly, to physical downlink control channel (PDCCH) limits for multiple cells scheduling one cell in fifth generation new radio (5G NR).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability;

and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including determining a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The method further includes receiving one or more PDCCH transmissions for the first cell from the second cell and the at least a third cell based on the PDCCH limit.

A further example implementation includes an apparatus for wireless communications comprising a memory and at least one processor in communication with the memory. The at least one processor may be configured to determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The at least one processor is further configured to receive one or more PDCCH transmissions for the first cell from the second cell and the at least a third cell based on the PDCCH limit.

An additional example implementation includes an apparatus for wireless communications. The apparatus may include means for determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The apparatus may further include means for receiving one or more PDCCH transmissions for the first cell from the second cell and the at least a third cell based on the PDCCH limit.

A further example implementation includes computer-readable medium storing computer code executable by a processor for wireless communications at a network entity comprising code for determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell, and receiving one or more PDCCH transmissions for the first cell from the second cell and the at least a third cell based on the PDCCH limit.

An example implementation includes a method of wireless communication, including determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The method may further include transmitting one or more PDCCH transmissions for the first cell from the second cell and the at least a third cell based on the PDCCH limit.

A further example implementation includes an apparatus for wireless communications comprising a memory and at least one processor in communication with the memory. The at least one processor may be configured to determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The at least one processor may be configured to transmit one or more PDCCH transmissions for the first cell from the second cell and the at least a third cell based on the PDCCH limit.

An additional example implementation includes an apparatus for wireless communications. The apparatus may include means for determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The apparatus may further include means for transmitting one or more PDCCH transmissions for the first cell from the second cell and the at least a third cell based on the PDCCH limit.

A further example implementation includes computer-readable medium storing computer code executable by a processor for wireless communications at a network entity comprising code for determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell, and transmitting one or more PDCCH transmissions for the first cell from the second cell and the at least a third cell based on the PDCCH limit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
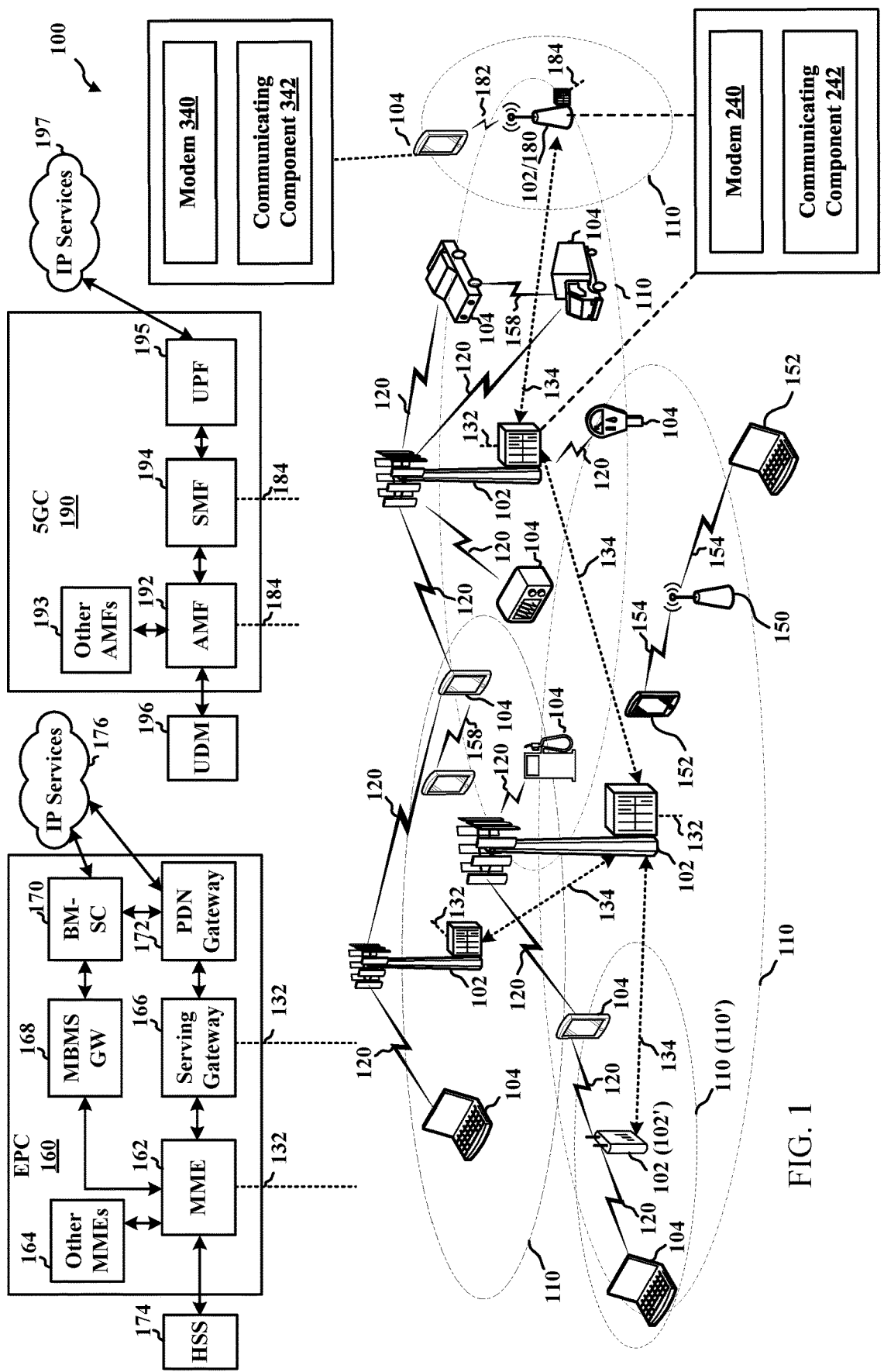
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to PDCCH limits for multiple cells scheduling one cell based on a reference cell in fifth generation new radio (5G NR). For example, in Long Term Evolution (LTE), a serving cell can only be scheduled by a single scheduling cell. In an instance, if the scheduling cell is the serving cell itself, then the process is referred to as self-scheduling. In other instances, if the scheduling cell is not the serving cell, then the process is referred to as cross-carrier scheduling.

In an aspect, a benefit arises from enabling a serving cell to be scheduled by multiple cells (e.g., greater than or equal to two cells). For example, if a secondary cell data is cross-carrier scheduled by non-fallback downlink control information (DCIs) (e.g., 0-1, 1-1) in another cell, the secondary cell data may also be self-scheduled by fallback DCIs (e.g., 0-0, 1-0) in itself. In another aspect, a primary cell data is cross-carrier scheduled by non-fallback DCIs (e.g., 0-1, 1-1) in another cell, all of the other DCIs including group common DCIs and DCIs for broadcast data scheduling are still received in the primary cell. Accordingly, multiple scheduling of one cell allows for a more flexible control resource utilization for carrier aggregation.

The present disclosure relates generally to current issues of physical downlink control channel (PDCCH) limits for multiple cells scheduling one cell based on a reference cell. For example, in an aspect, the present disclosure includes a method, apparatus, and non-statutory computer readable medium for wireless communications for determining a PDCCH limit corresponding to at least one of a number of blind detections (BDs) and a number of control channel elements (CCEs) used for decoding PDCCH candidates for a first cell, a second cell that is scheduled by the first cell and at least a third cell that schedules the second cell, wherein at least one of the third cell is the same cell as the second cell or the third cell is different from the second cell; and receiving one or more PDCCH transmissions from the first cell, the second cell, and the third cell based on the PDCCH limit.

In one implementation, the present implementations determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell. The present implementations further receive one or more PDCCH transmissions for the first cell from the second cell and the at least a third cell based on the PDCCH limit.

The described features will be presented in more detail below with reference to FIGS. 1-8.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and communicating component 242 for determining PDCCH limits for a cell scheduled by multiple cells, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for determining PDCCH limits for a cell scheduled by multiple cells, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 5:
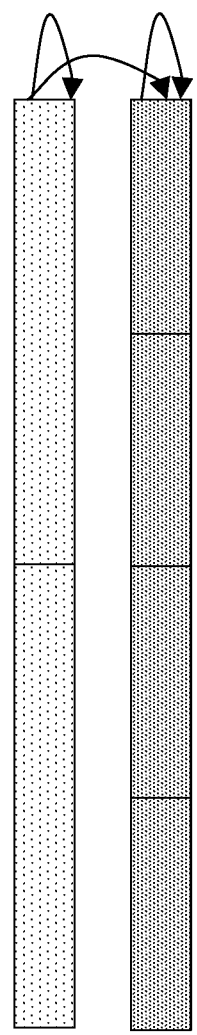
FIG. 5 is a diagram illustrating an example of cross-scheduling and self-scheduling among two cells.
Figure 6:
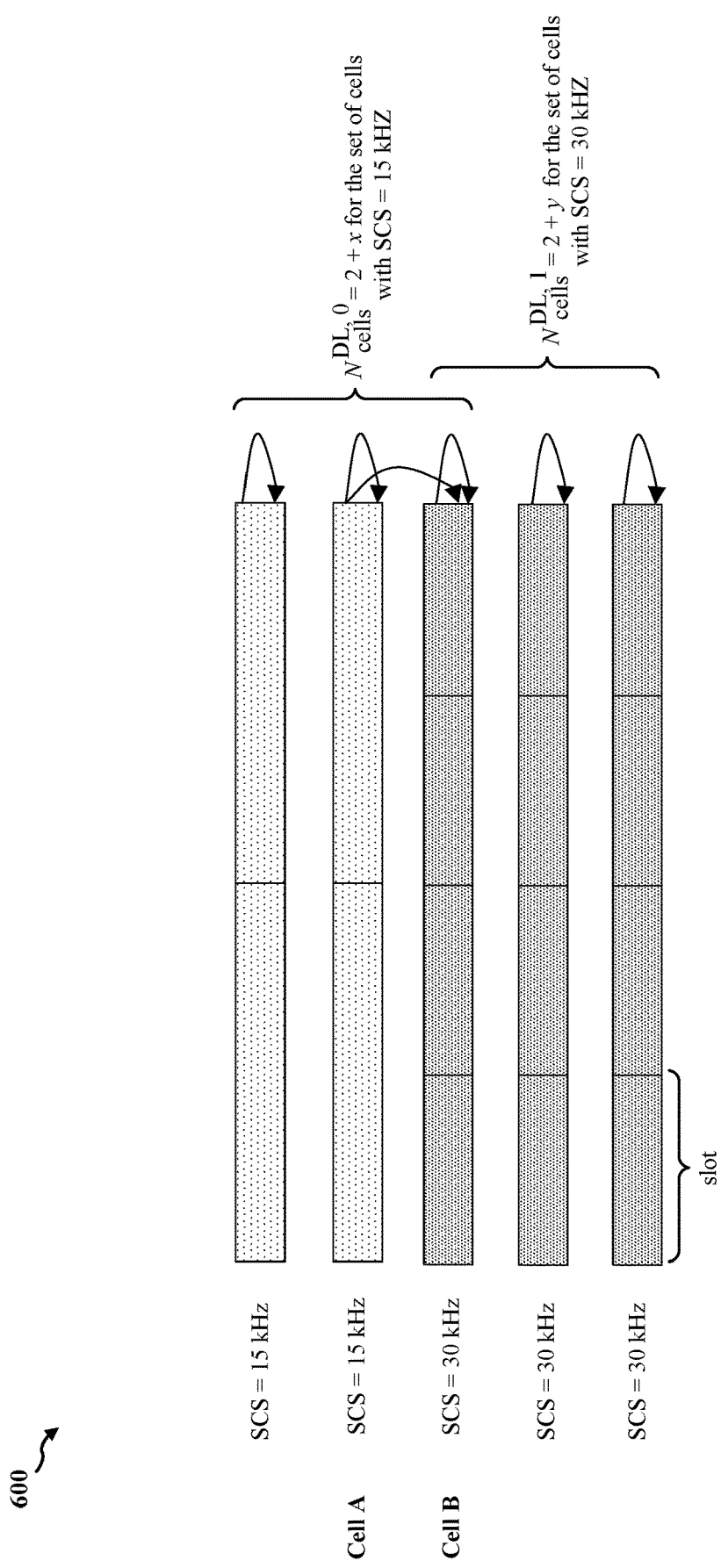
FIG. 6 is a diagram illustrating an example of multiple cross-scheduling and self-scheduling among multiple cells with different SCS.
Figure 7A:
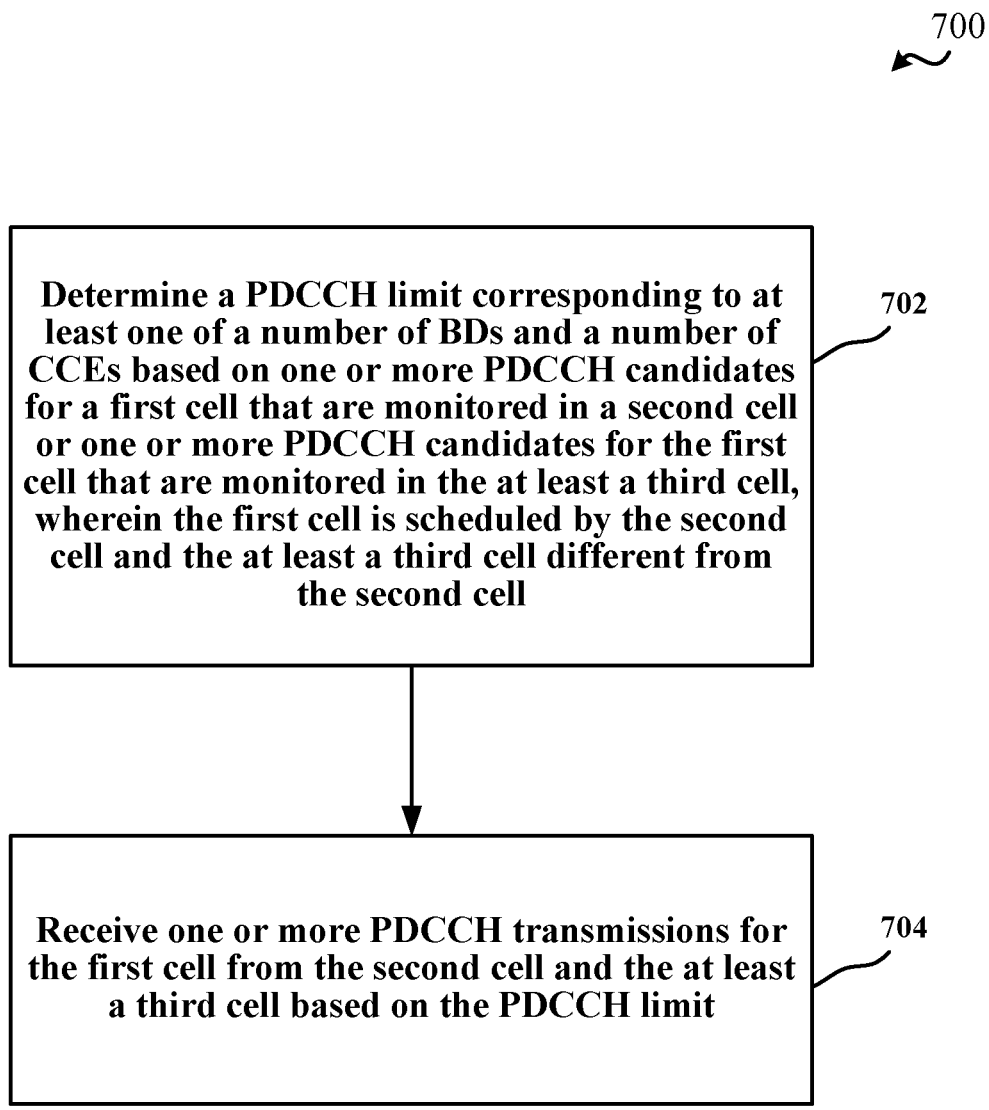
FIG. 7A is a flowchart of a method of wireless communication at a UE, and more specifically physical downlink control channel (PDCCH) limits for multiple cells scheduling one cell.
Figure 7B:
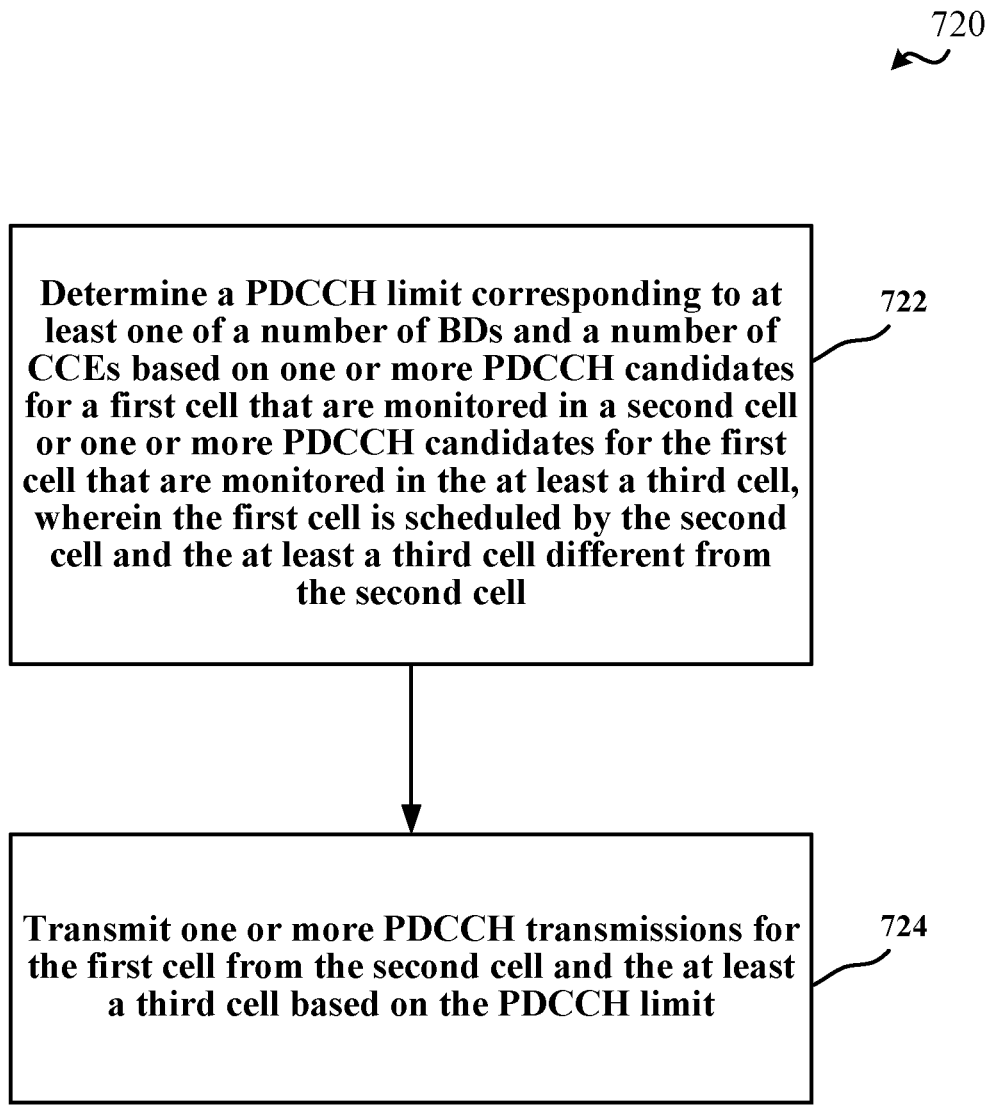
FIG. 7B is a flowchart of a method of wireless communication at a network entity, and more specifically PDCCH limits for multiple cells scheduling one cell based on a reference cell.

Turning now to FIGS. 2-7B, aspects are depicted with reference to one or more components and one or more methods that may perform the actions or operations described herein, where aspects in dashed line may be optional. Although the operations described below in FIGS. 7A and 7B are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
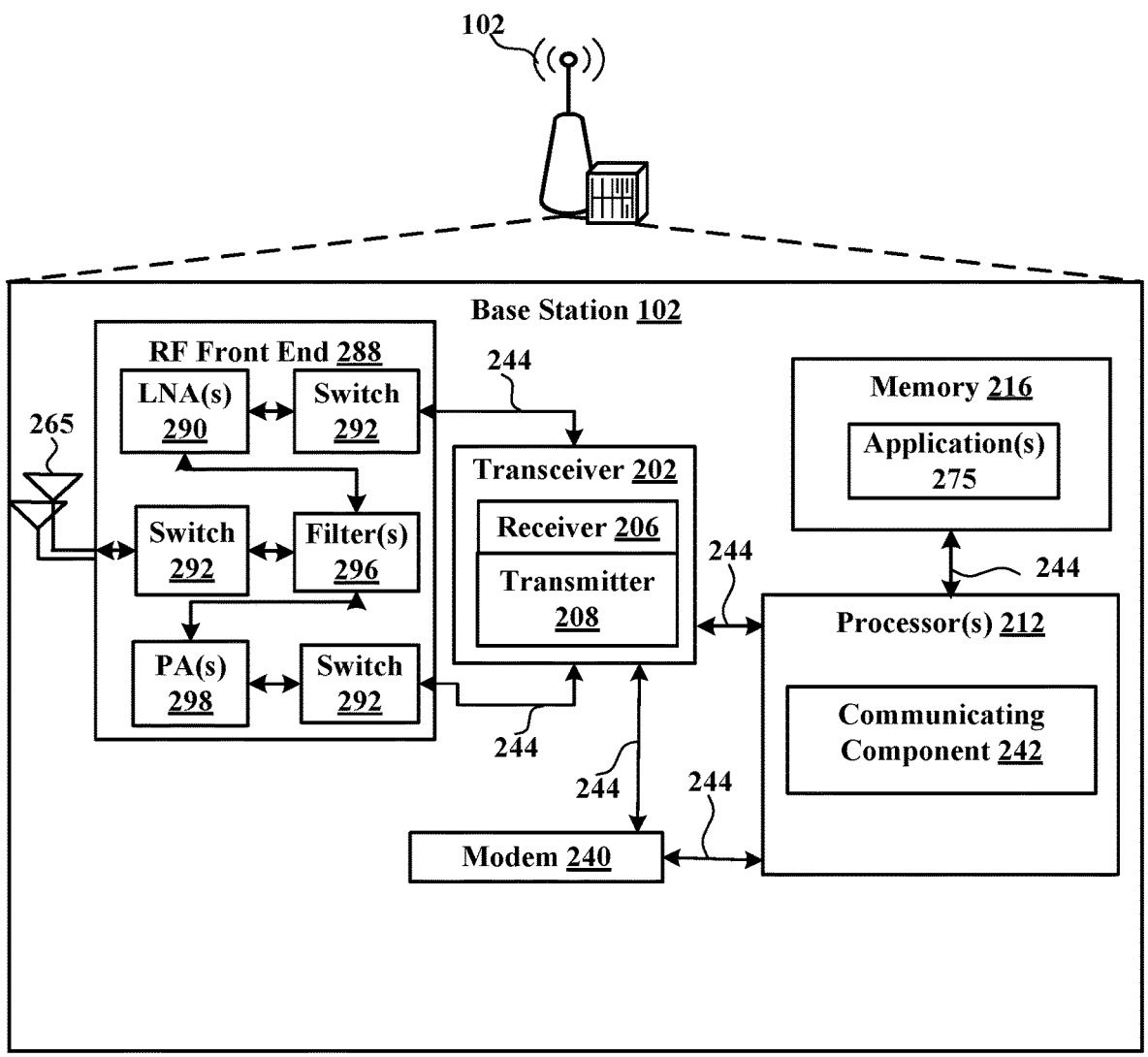
FIG. 2 is a block diagram illustrating an example of a network entity (also referred to as a base station), in accordance with various aspects of the present disclosure.

Referring to FIG. 2, one example of an implementation of a node acting as an IAB node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for beam configurations based on QCL indications.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 8. Similarly, the memory 216 may correspond to the memory described in connection with the UE in FIG. 8.

Figure 3:
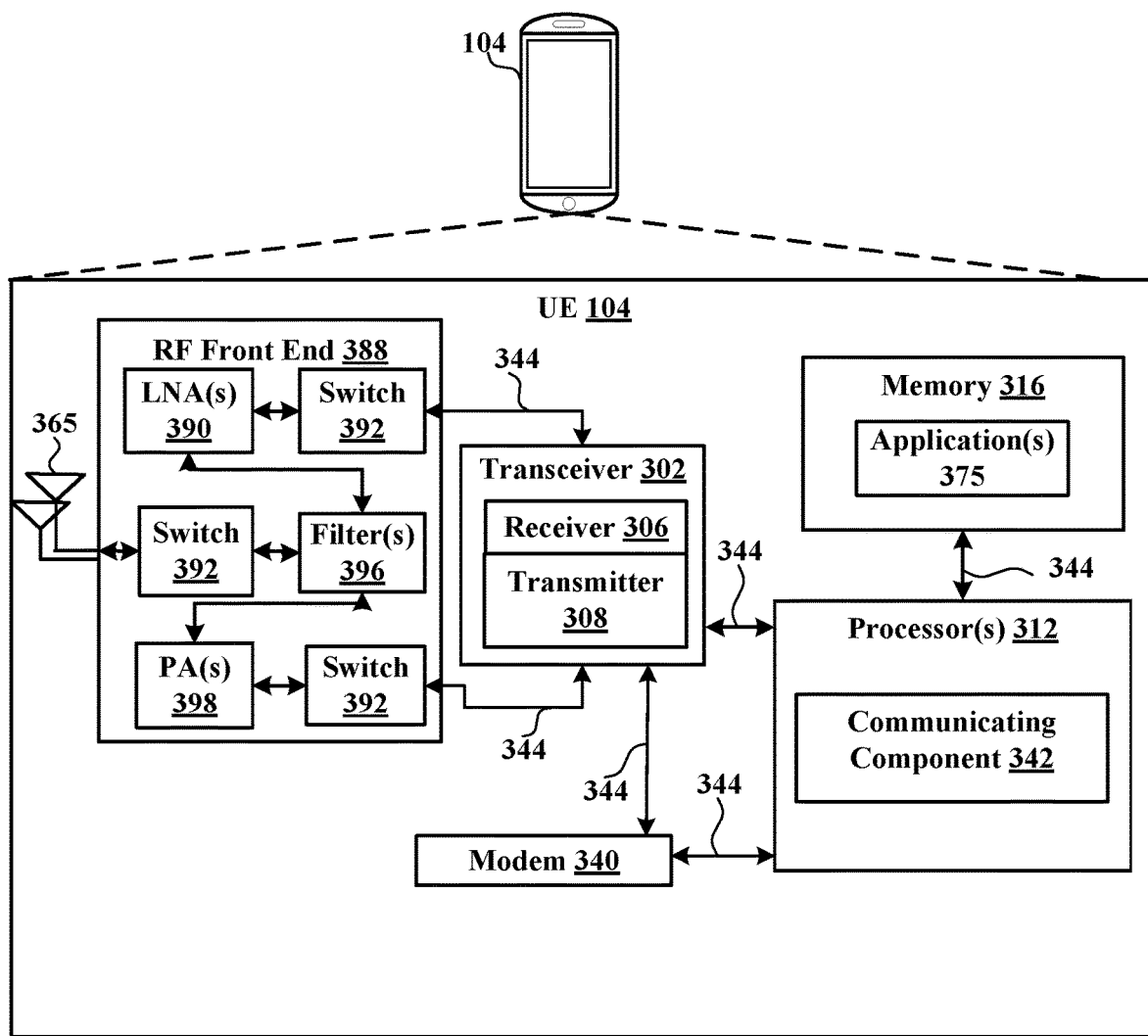
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

Figure 4:
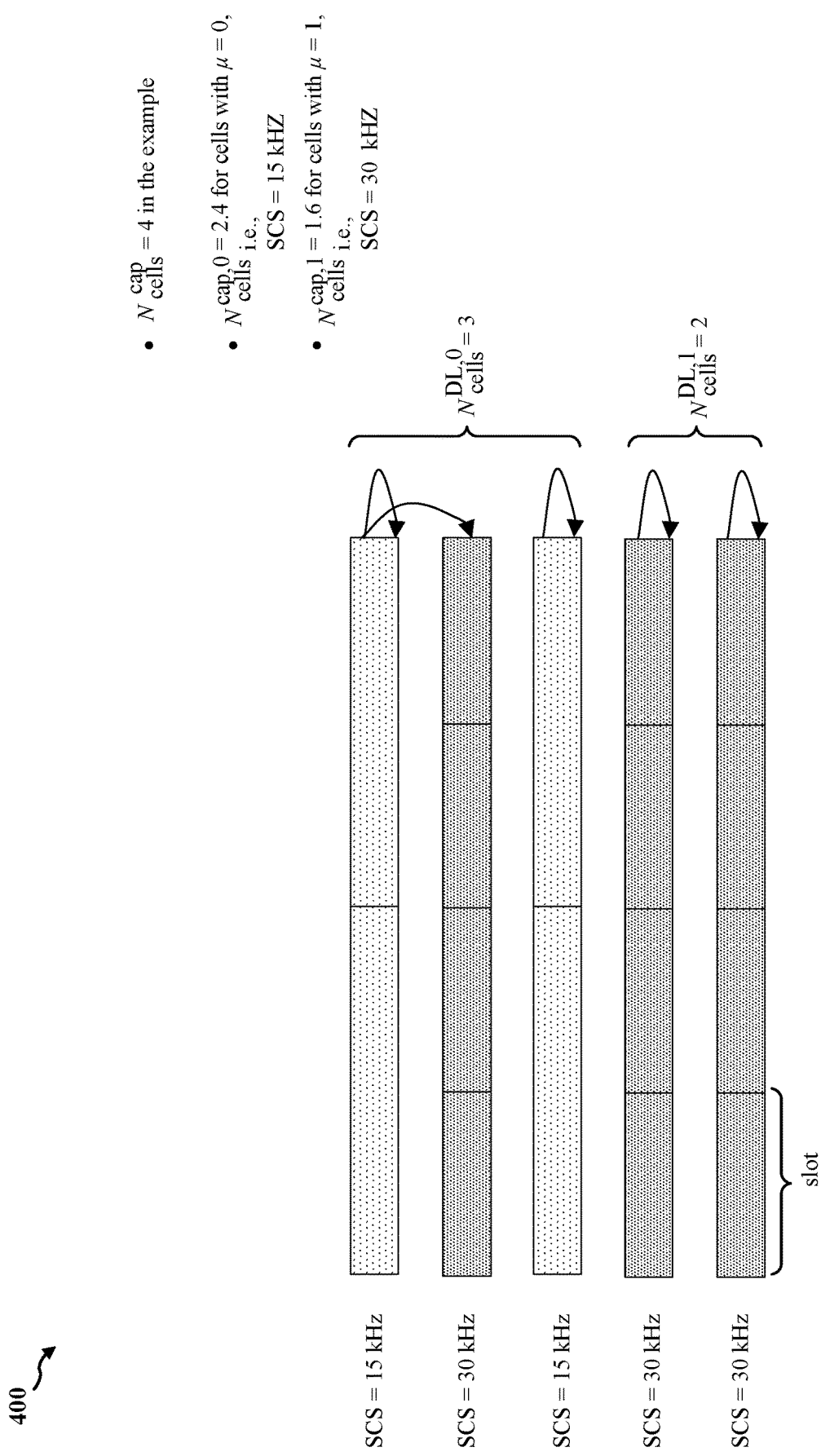
FIG. 4 is a diagram illustrating an example of cross-scheduling and self-scheduling between different cells.

FIG. 4 is a diagram 400 illustrating an example of cross-scheduling and self-scheduling between different cells. In an aspect, when NR-dual connectivity (DC) is configured to the UE, the PDCCH limit is separately determined for each cell group (CG) separately. For example, a UE, such as UE 104, may determine the reference number of configured downlink (DL) cells, $N_{cells}^{cap}$.

In an aspect, at a first step, when the UE is not configured with NR-DC and if the UE reports the PDCCH blind decode capability message (e.g., pdcch-BlindDetectionCA), then $N_{cells}^{cap}$ is equal to the value of pdcch-BlindDetectionCA. In an example, the capability applies to both the BD limit and the PDCCH limit. In another aspect, when the UE is configured with NR-DC, for each CG (e.g., master cell group (MCG), secondary cell group (SCG), etc.), $N_{cells}^{cap}$ equals the value of the reference number of cells for the CG that is provided by the network (e.g., pdcch-BlindDetection-MCG for the MCG and pdcch-BlindDetectionSCG for the SCG.

In an aspect, at a second step, the UE may determine a reference number of cells, $N_{cells}^{cap,\mu}$ for the set of cells with the same numerology configuration μ (e.g., μ may be 0, 1, 2 and 3 for subcarrier spacing (SCS) 15, 30, 60, and 120 kHz, respectively). For example, the UE proportionally splits $N_{cells}^{cap}$ across different sets of cells associated with different μ values based on the number of configured DL cells that has the numerology factor μ the result is:

$$N_{cells}^{cap,\mu} = N_{cells}^{cap} \cdot N_{cells}^{DL,\mu} / N_{cells}^{DL}$$

wherein $N_{cells}^{DL,\mu}$ is the number of configured DL cells that has μ, and $N_{cells}^{DL} = \Sigma_{j=0}^{3} N_{cells}^{DL,j}$ is the number of configured DL cells.

In an aspect, at a third step, the UE may determine that the total PDCCH BD limit and the CCE limit for the set of cells associated with the same numerology factor μ. For example, the total PDCCH BD limit (e.g., the maximum total number of BDs the UE is expected to process for this set of cells per slot) is:

$$M_{PDCCH}^{total,slot,\mu} = \lfloor N_{cells}^{cap,\mu} \cdot M_{PDCCH}^{max,slot,\mu} \rfloor$$

Further, in an example, the total PDCCH CCE limit (e.g., the maximum total number of non-overlapped CCEs the UE is expected to process for this set of cells per slot) may be:

$$C_{PDCCH}^{total,slot,\mu} = \lfloor N_{cells}^{cap,\mu} \cdot C_{PDCCH}^{max,slot,\mu} \rfloor$$

wherein $M_{PDCCH}^{max,slot,\mu}$ and $C_{PDCCH}^{max,slot,\mu}$ are the maximum numbers of monitored PDCCH candidates and non-overlapped CCEs that the UE is expected to process in a single cell per slot. In an example, μ is the numerology configured for the active bandwidth portion (BWP) of the cell if the cell is activated and μ is the numerology configured for the first BWP to be activated for a de-activated cell. In a further example, the monitored PDCCH candidate may be equivalent to the BD.

In an aspect, at a fourth step, the UE may determine the per cell PDCCH BD limit and the CCE limit for each scheduled DL cell that is associated with the numerology factor μ based on the maximum number of BDs the UE is expected to process in a slot for each cell associated with numerology factor μ is $\min(M_{PDCCH}^{total,slot,\mu}, M_{PDCCH}^{max,slot,\mu})$, and the maximum number of non-overlapped CCEs the UE is expected to process in a slot for each cell associated with numerology factor μ is $\min(C_{PDCCH}^{total,slot,\mu}, C_{PDCCH}^{max,slot,\mu})$.

In an aspect, if the UE does not report pdcch-BlindDetectionCA, as mentioned in the first step, the reference number of cells is $N_{cells}^{cap}$=number of configured DL cells, (i e $N_{cells}^{cap}=\Sigma_{j=0}^{3}N_{cells}^{DL,j}$) According to the second step, the reference number of cells for numerology μ is $N_{cells}^{cap,\mu}=N_{cells}^{DL,\mu}$ (i.e., the number of configured DL cells having numerology μ).

According to the third step, the total BD/CCE limit in a slot for the set of cells associated with μ is $M_{PDCCH}^{total,slot,\mu}=N_{cells}^{DL,\mu} \cdot M_{PDCCH}^{max,slot,\mu}$ and $C_{PDCCH}^{total,slot,\mu}=N_{cells}^{DL,\mu} \cdot C_{PDCCH}^{max,slot,\mu}$. Additionally in the third step, the per cell BD/CCE limit in a slot for each cell associated with μ is $\min(M_{PDCCH}^{total,slot,\mu}, M_{PDCCH}^{max,slot,\mu})=M_{PDCCH}^{max,slot,\mu}$ and $\min(C_{PDCCH}^{total,slot,\mu}, C_{PDCCH}^{max,slot,\mu})=C_{PDCCH}^{max,slot,\mu}$. In this example, the per cell limit is defined. As long as the per cell limit is satisfied for each configured DL cell having μ, the total limit is always satisfied for each set of configured DL cells having μ. This also applies to the case that the UE reports pdcch-BlindDetectionCA and the total number of configured DL cells $N_{cells}^{DL} \leq N_{cells}^{cap}$. For example, the UE is configured with 4 cells but reports a capability value of 5.

FIG. 5 is a diagram illustrating an example of cross-scheduling and self-scheduling scheme 500 among two cells. For carrier aggregation by which a cell (i.e., cell B in FIG. 5) is scheduled by two cells (e.g., cell A and cell B), to determine the BD and CCE limits for PDCCH for the scheduled cell (e.g., cell B) in slots of cell B and in slots of cell A, the network may allocate 'x' parts of the per cell limit of cell B to PDCCH candidates received in its first scheduling cell (cell A), and allocate 'y' parts of the per cell limit of cell B to PDCCH candidates in its second scheduling cell (cell B) such that 'x'+'y'=1.

In some implementations, if cell B with μ_B is cross-carrier scheduled by another cell A with μ_A, to determine PDCCH limits, cell B is assumed to have the numerology same as the numerology of its scheduling cell μ_A. As an extension of the aforementioned feature, for PDCCH limit determination, in the scenario that one cell is cross-carrier scheduled by multiple (i.e., ≥2) cells, the network can count PDCCH candidates for cell B that are monitored in cell A into the total BD/CCEs limit for the set of cells that has cell A's SCS. In some aspects, since 'x' part of cell B's per cell limit is assigned to these PDCCH candidates monitored in cell A, a cell number for cell B 'x' is counted into the cell number for the set of cells having cell A's SCS.

In some implementations, the network can count PDCCH candidates for cell B that are monitored in cell B into the total BD/CCEs limit for the set of cells that has cell B's SCS. Since 'y' part of cell B's per cell limit is assigned to these PDCCH candidates monitored in cell B, a cell number for cell B 'y' is counted into the cell number for the set of cells having cell B's SCS.

FIG. 6 is a diagram illustrating an example of multiple cross-scheduling and self-scheduling 600 among multiple cells with different SCS. In this example, cell B is scheduled by cell A. There are also two more cells with SCS=30 kHz and one cell with SCS=15 kHz that are self-scheduled. FIG. 6 shows the number of cells for the set of cells with SCS=15 kHz ($N_{cells}^{DL,0}$), and the number of cells for the set of cells with SCS=30 kHz ($N_{cells}^{DL,1}$).

In a first implementation, the UE may be configured with carrier aggregation. If any serving cell can be scheduled by multiple cells (one of the scheduling cells can be the serving cell itself), the total number of configured DL cells associated with numerology μ ($N_{cells}^{DL,\mu}$) for PDCCH limit calculation may be replaced by $N_{cells}^{DL,\mu}=\Sigma_{c_1}\Sigma_{c_2} x_{c_1,c_2,\mu}$, and the total number of all configured DL cells ($N_{cells}^{DL}$) is replaced by $N_{cells}^{DL}=\Sigma_\mu N_{cells}^{DL,\mu}=\Sigma_\mu \Sigma_{c_1} \Sigma_{c_2} x_{c_1,c_2,\mu}$. In some aspects, the summations are across cell IDs for DL configured cells for the UE. Cell $c_1$ may be the scheduled cell scheduled by a cell $c_2$ having numerology μ. $x_{c_1,c_2,\mu}$ is zero if $c_1$ may not be scheduled by cell $c_2$ or cell $c_2$ numerology is not μ. $x_{c_1,c_2,\mu}$ is one if $c_1$ may only be scheduled by one cell $c_2$ with μ.

In a second implementation, the values of $x_{c_1,c_2,\mu}$ may be determined in a number of methods. In one example, the values may be configured by the network for each cell pair of $c_1$ and $c_2$. In another example, the UE may report the values to the network, e.g., as capabilities. In a further example, the UE and network may calculate $x_{c_1,c_2,\mu}$, e.g., based on $\Sigma_\mu \Sigma_{c_2} x_{c_1,c_2,\mu}=1$ for each scheduled cell $c_1$ and/or $x_{c_1,c_2,\mu}$ is proportional to a quantity of PDCCH configured for the scheduled cell $c_1$ and the scheduling cell $c_2$, such as number of configured search space sets, number of configured PDCCH candidates, number of CCEs for the configured PDCCH candidates, etc.

In a third implementation, a serving cell may be scheduled by up to two cells and one of the scheduling cell is the serving cell itself (i.e., self-scheduling). Then, for each scheduled cell $c_1$, at most two values of $x_{c_1,c_2,\mu}$ are non-zero for all $c_2$.

In a fourth implementation, the third implementation may be modified based on $\Sigma_\mu \Sigma_{c_2} x_{c_1,c_2,\mu}=1$ for each scheduled cell $c_1$. For every cell that is scheduled by two cells, all non-zero values of $x_{c_1,c_2,\mu}$ may be identical for cross-carrier scheduling (i.e., $c_1 \neq c_2$) and all non-zero values of $x_{c_1,c_2,\mu}$ may be identical for self-scheduling (i.e., $c_1$ is equal to $c_2$). Further, only one non-zero value of all $x_{c_1,c_2,\mu}$ may need to be determined. For example, the UE may report r=non-zero value of $x_{c_1,c_2,\mu}$ for cross-carrier scheduling in capability reporting and the non-zero $x_{c_1,c_2,\mu}$ for self-scheduling is just 1−r.

In a fifth implementation related to a UE PDCCH blind decode capability report and reference number of cells, the UE may report the joint PDCCH blind decode capability to network (i.e., pdcch-BlindDetectionCA) when it is possible that any serving cell of the UE can be scheduled by multiple cells and the UE can be configured with DL cells such that $N_{cells}^{DL}=\Sigma_\mu N_{cells}^{DL,\mu}=\Sigma_\mu \Sigma_{c_1} \Sigma_{c_2} x_{c_1,c_2,\mu}$ is larger than a threshold (e.g., 4). In this case, the reference number of configured DL cells ($N_{cells}^{cap}$) is determined in the same way as the normal CA case in step 1, as described herein.

In a sixth implementation related to a UE PDCCH blind decode capability report and reference number of cells, when the UE does not report the joint PDCCH blind decode capability to network (i.e., pdcch-BlindDetectionCA) and any serving cell of the UE is scheduled by multiple cells, the reference number of DL configured cells $N_{cells}^{cap}$ may be equal to $N_{cells}^{DL} = \Sigma_\mu N_{cells}^{DL,\mu} = \Sigma_\mu \Sigma_{c_1} \Sigma_{c_2} x_{c_1,c_2,\mu}$ based on values of $x_{c_1,c_2,\mu}$ for cells configured to the UE.

A seventh implementation may be directed to defining a total PDCCH BD/CCE limit for a set of cells associated with the same μ. For example, the maximum number of BDs and maximum number of CCEs for PDCCH candidates received in the set of cells associated with the same numerology factor μ, and $M_{PDCCH}^{total,slot,\mu}$ and $C_{PDCCH}^{total,slot,\mu}$ may be determined in the same way as the normal CA case in step 3 by using $N_{cells}^{DL,\mu}$, $N_{cells}^{DL}$ and $N_{cells}^{cap}$, as described herein.

An eighth implementation may be directed to defining the per cell limit for PDCCH candidates for each pair of c_1 and c_2. For example, the maximum number of BDs and maximum number of CCEs for PDCCH candidates may be determined for the scheduled cell $c_1$ that are monitored in the scheduling cell $c_2$ associated with the numerology factor μ based on $M_{PDCCH}^{total,slot,\mu}$ and $C_{PDCCH}^{total,slot,\mu}$ that are defined in the seventh implementation in the same ways as the normal CA case in step 4 by $\min(M_{PDCCH}^{total,slot,\mu}, x_{c_1,c_2,\mu} \cdot M_{PDCCH}^{total,slot,\mu})$ and $\min(C_{PDCCH}^{total,slot,\mu}, x_{c_1,c_2,\mu} \cdot C_{PDCCH}^{total,slot,\mu})$.

In a ninth implementation, a serving cell may be configured by multiple cells, when scheduling cells have the same numerology, the maximum number of BDs and the maximum number of CCEs for PDCCH candidates for each pair of $c_1$ and $c_2$ may not be determined separately. When multiple cells scheduling the same cell have the same numerology, instead of defining the maximum number of BDs and the maximum number of CCEs for each pair of $c_1$ and $c_2$ separately, the combined maximum number of BDs and the combined maximum number of CCEs for PDCCH candidates for the scheduled cell that are monitored in all scheduling cells with the same numerology μ may be defined by $\min(M_{PDCCH}^{total,slot,\mu}, \Sigma_{c_2} x_{c_1,c_2,\mu} \cdot M_{PDCCH}^{total,slot,\mu})$ and $\min(C_{PDCCH}^{total,slot,\mu}, \Sigma_{c_2} x_{c_1,c_2,\mu} \cdot C_{PDCCH}^{total,slot,\mu})$. Correspondingly, $\Sigma_{c_2} x_{c_1,c_2,\mu}$ for each scheduled cell $c_1$ and all scheduling cells with same numerology μ may be defined instead of defining $x_{c_1,c_2,\mu}$ for each pair of $c_1$ and $c_2$, separately. The benefit of this implementation is that BD limit and CCE limit can be shared by a serving cell's scheduling cells having the same numerology.

Turning now to FIGS. 7A and 7B, aspects are depicted with reference to one or more components and one or more methods that may perform the actions or operations described herein, where aspects in dashed line may be optional. Although the operations described below in FIGS. 7A and 7B are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1, 2, 3, and/or 8, as described herein, a specially-programmed processor, a processor executing specially-programmed software or computer-readable media, or by any other combination of a hardware component and/or a software component capable of performing the described actions or functions.

FIG. 7A illustrates a flow chart of an example of a method 700 for wireless communication, for example, at a UE. In an example, UE 104 can perform the functions described in method 700 using one or more of the components described in FIGS. 1, 3, and 8.

At block 702, the method 700 may determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, the first cell is scheduled by the second cell and the at least a third cell different from the second cell. In an aspect, the communicating component 342, e.g., in conjunction with processor(s) 312, memory 316, and/or transceiver 302, may be configured to determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, the first cell is scheduled by the second cell and the at least a third cell different from the second cell. Thus, the UE 104, the processor(s) 312, the communicating component 342 or one of its subcomponents may define the means for determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, the first cell is scheduled by the second cell and the at least a third cell different from the second cell.

At block 704, the method 500 may receive one or more PDCCH transmissions for the first cell from the second cell and the at least a third cell based on the PDCCH limit. In an aspect, the communicating component 342, e.g., in conjunction with processor(s) 312, memory 316, and/or transceiver 302, may be configured to receive one or more PDCCH transmissions for the first cell from the second cell and the at least a third cell based on the PDCCH limit. Thus, the UE 104, the processor(s) 312, the communicating component 342 or one of its subcomponents may define the means for receiving one or more PDCCH transmissions for the first cell from the second cell and the at least a third cell based on the PDCCH limit.

In some aspects, the first cell may correspond to a scheduled cell, and wherein determining the PDCCH limit includes determining the PDCCH limit corresponding to the number of BDs and the CCEs in a slot of the second cell and a slot of the third cell. For example, carrier aggregation for a cell may be scheduled by two cells.

In some aspects, determining the PDCCH limit includes allocating, in one or more slots of the second cell and one or more corresponding slots of the third cell, a first subset of parts of the PDCCH limit to the PDCCH candidates for the first cell received in the second cell and a second subset of parts of the PDCCH limit to the PDCCH candidates for the first cell received in the third cell.

In some aspects, a sum of the first subset of parts and the second subset of parts equals one in the one or more slots of the second cell and the one or more corresponds slots of the third cell.

In some aspects, the method 700 may further include configuring a UE with carrier aggregation. In an aspect, the communicating component 342, e.g., in conjunction with processor(s) 312, memory 316, and/or transceiver 302, may be configured to configure a UE with carrier aggregation. Thus, the UE 104, the processor(s) 312, the communicating component 342 or one of its subcomponents may define the means for configuring a UE with carrier aggregation.

In some aspects relating to the first implementation described herein with respect to FIG. 6, determining the PDCCH limit may include determining that the first cell can be scheduled by the second cell and a third cell, replacing a first total number of configured downlink cells associated with a numerology by a summation of cells according to at least parameter associated with a scheduling cell, a scheduled cell and the numerology of the scheduling cell, and replacing a second total number of configured downlink cells by a different summation of cells according to at least the parameter. In other words, the PDCCH limit determination may correspond to the replacement.

In some aspects, the first summation of cells and the second summation of cells may be across cell identifiers for downlink configured cells for the UE.

In some aspects, the first cell may correspond to the scheduled cell scheduled by the second cell.

In some aspects, the method 700 may further include setting the parameter to zero when the first cell is not scheduled by the second cell or the numerology of the second cell is not the set numerology, and setting the parameter to one when the first cell is only scheduled by the second cell with the set numerology. In an aspect, the communicating component 342, e.g., in conjunction with processor(s) 312, memory 316, and/or transceiver 302, may be configured to set the parameter to zero when the first cell is not scheduled by the second cell or the numerology of the second cell is not the set numerology, and setting the parameter to one when the first cell is only scheduled by the second cell with the set numerology. Thus, the UE 104, the processor(s) 312, the communicating component 342 or one of its subcomponents may define the means for setting the parameter to zero when the first cell is not scheduled by the second cell or the numerology of the second cell is not the set numerology, and setting the parameter to one when the first cell is only scheduled by the second cell with the set numerology.

In some aspects relating to the second implementation described herein with respect to FIG. 6, the method 700 may further include determining the parameter based on one of a network configuration for each cell pair including the first cell and the second cell, a UE report including a value of the parameter, or a UE and network calculation. In an aspect, the communicating component 342, e.g., in conjunction with processor(s) 312, memory 316, and/or transceiver 302, may be configured to determine the parameter based on one of a network configuration for each cell pair including the first cell and the second cell, a UE report including a value of the parameter, or a UE and network calculation. Thus, the UE 104, the processor(s) 312, the communicating component 342 or one of its subcomponents may define the means for determining the parameter based on one of a network configuration for each cell pair including the first cell and the second cell, a UE report including a value of the parameter, or a UE and network calculation.

In some aspects, the UE and network calculation may be based on a summation of a set of cells and the parameter as a product of a value of one for each scheduled cell.

In some aspects, the UE and network calculation may be based on the parameter corresponding to a proportional quantity of PDCCH configured for the scheduled cell and the scheduling cell.

In some aspects relating to the third implementation described herein with respect to FIG. 6, the third cell may be the same cell as the first cell, the first cell may be self-scheduled, and cross-carrier scheduled by the second cell. For instance, a serving cell may be scheduled by up to two cells, where one of the scheduling cells is the serving cell (i.e., self-scheduling).

In some aspects, for each scheduled cell may be scheduled by at most two cells, and no more than two values of the parameter are non-zero for the scheduled cell.

In some aspects relating to the fourth implementation described herein with respect to FIG. 6, a summation of the parameters associated with first cell and cells that schedule the first cell may be equal to one for the first cell.

In some aspects, for each cell scheduled by two cells, all non-zero values of the parameter may be identical for cross-carrier scheduling and self-scheduling, respectively.

In some aspects, determining a non-zero value of the parameter for cross-carrier scheduling, a non-zero value of the parameter for self-scheduling may correspond to a difference of one and the non-zero value of the parameter for cross-carrier scheduling.

In some aspects relating to the fifth implementation described herein with respect to FIG. 6, the method 700 may further include reporting a PDCCH blind decode capability indication when a serving cell can be scheduled by multiple cells and a UE can be configured with one or more downlink cells such that a number of configured downlink cells equal to a summation of cells including one or more parameters each associated with a scheduling cell, a scheduled cell and the numerology of the scheduling cell is larger than a threshold value. In an aspect, the communicating component 342, e.g., in conjunction with processor(s) 312, memory 316, and/or transceiver 302, may be configured to report a PDCCH blind decode capability indication when a serving cell can be scheduled by multiple cells and a UE can be configured with one or more downlink cells such that a number of configured downlink cells equal to a summation of cells including one or more parameters each associated with a scheduling cell, a scheduled cell and the numerology of the scheduling cell is larger than a threshold value. Thus, the UE 104, the processor(s) 312, the communicating component 342 or one of its subcomponents may define the means for reporting a PDCCH blind decode capability indication when a serving cell can be scheduled by multiple cells and a UE can be configured with one or more downlink cells such that a number of configured downlink cells equal to a summation of cells including one or more parameters each associated with a scheduling cell, a scheduled cell and the numerology of the scheduling cell is larger than a threshold value.

In some aspects relating to the sixth implementation described herein with respect to FIG. 6, a reference number of downlink cells is equal to a number of configured downlink cells equal to a summation of cells including a parameter associated with a scheduling cell, a scheduled cell and the numerology of the scheduling cell for cells configured to a UE when a PDCCH blind decode capability indication is not reported and any serving cell is scheduled by multiple cells.

In some aspects relating to the seventh implementation described herein with respect to FIG. 6, determining the PDCCH limit corresponding to at least one of a number of BDs and a number of CCEs may include determining a maximum number of BDs and CCEs for one or more PDCCH candidates received in a set of cells associated with a numerology factor.

In some aspects relating to the eighth implementation described herein with respect to FIG. 6, determining the PDCCH limit may include determining a maximum number of BDs and CCEs for a scheduled cell corresponding to the first cell that is monitored in a scheduling cell corresponding to the second cell and associated with a numerology factor based on a minimum and maximum number of PDCCH slots.

In some aspects relating to the ninth implementation described herein with respect to FIG. 6, determining the PDCCH limit corresponding to at least one of a number of BDs and a number of CCEs may include determining a combined maximum number of BDs and CCEs for one or more PDCCH candidates for the scheduled cell that is monitored in all scheduling cells having a similar numerology factor.

FIG. 7B illustrates a flow chart of an example of a method 720 for wireless communication, for example, at a network entity. In an example, a base station 102 can perform the functions described in method 720 using one or more of the components described in FIGS. 1, 2, and 8.

At block 722, the method 700 may determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, the first cell is scheduled by the second cell and the at least a third cell different from the second cell. In an aspect, the communicating component 242, e.g., in conjunction with processor(s) 212, memory 216, and/or transceiver 202, may be configured to determine a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, the first cell is scheduled by the second cell and the at least a third cell different from the second cell. Thus, the base station 102, the processor(s) 212, the communicating component 242 or one of its subcomponents may define the means for determining a PDCCH limit corresponding to at least one of a number of BDs and a number of CCEs based on one or more PDCCH candidates for a first cell that are monitored in a second cell or one or more PDCCH candidates for the first cell that are monitored in the at least a third cell, the first cell is scheduled by the second cell and the at least a third cell different from the second cell.

At block 704, the method 500 may receive one or more PDCCH transmissions for the first cell from the second cell and the at least a third cell based on the PDCCH limit. In an aspect, the communicating component 242, e.g., in conjunction with processor(s) 212, memory 216, and/or transceiver 202, may be configured to receive one or more PDCCH transmissions for the first cell from the second cell and the at least a third cell based on the PDCCH limit. Thus, the base station 102, the processor(s) 212, the communicating component 242 or one of its subcomponents may define the means for receiving one or more PDCCH transmissions for the first cell from the second cell and the at least a third cell based on the PDCCH limit.

Figure 8:
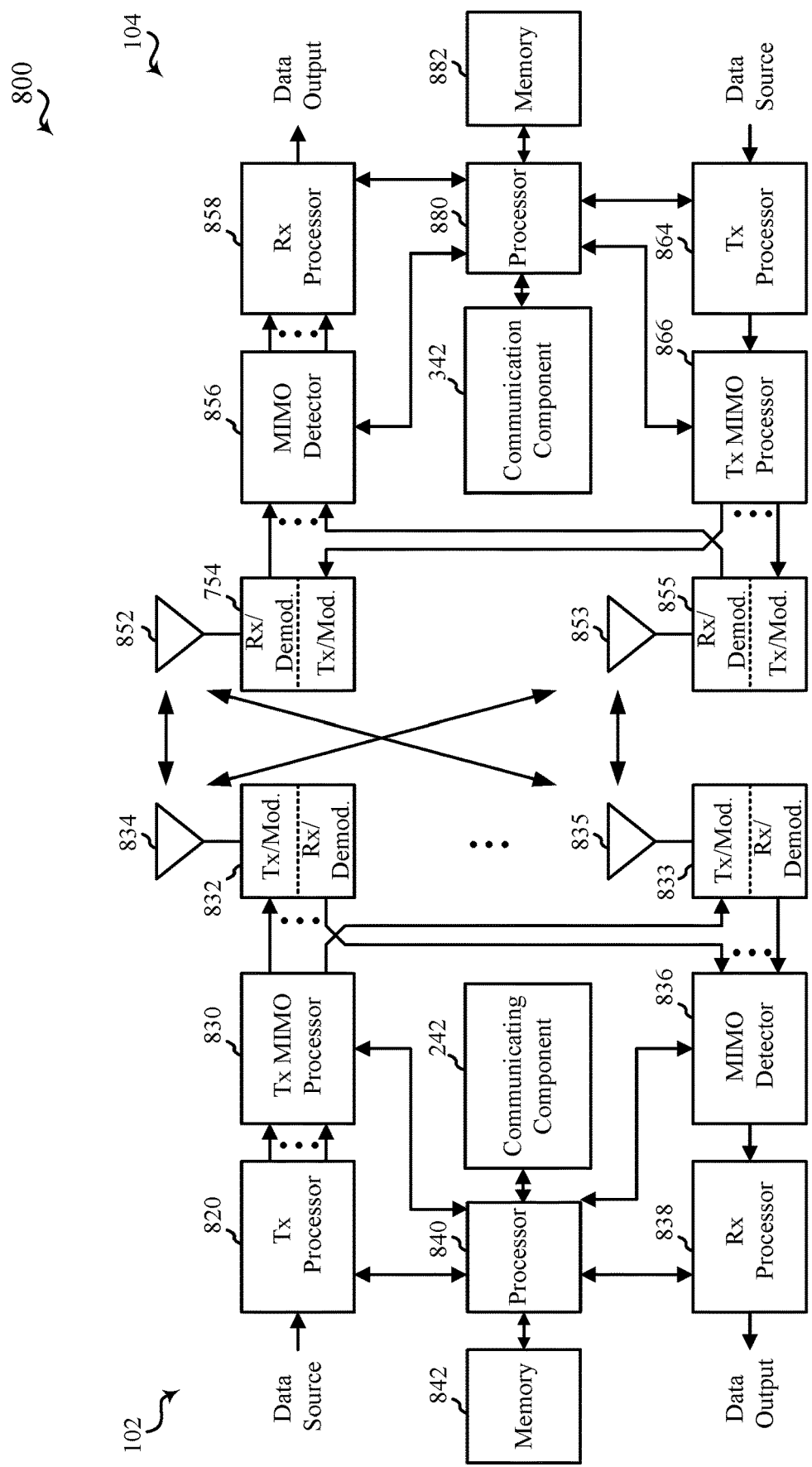
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware.

Each of the noted components may be a means for performing one or more functions related to operation of the MIMO communication system 800.

SOME ADDITIONAL EXAMPLES

The aspects described herein additionally include one or more of the following implementation examples described in the following numbered clauses.

1. A method of wireless communication, comprising:
determining a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell; and
communicating one or more PDCCH transmissions for the first cell from the second cell and the at least a third cell based on the PDCCH limit.

2. The method of clause 1, wherein the first cell corresponds to a scheduled cell, and wherein determining the PDCCH limit includes determining the PDCCH limit corresponding to the number of BDs and the CCEs in a slot of the second cell and a slot of the third cell.

3. The method of any preceding clause, wherein determining the PDCCH limit includes allocating, in one or more slots of the second cell and one or more corresponding slots of the third cell, a first subset of parts of the PDCCH limit to the PDCCH candidates for the first cell received in the second cell and a second subset of parts of the PDCCH limit to the PDCCH candidates for the first cell received in the third cell.

4. The method of any preceding clause, wherein a sum of the first subset of parts and the second subset of parts equals one in the one or more slots of the second cell and the one or more corresponds slots of the third cell.

5. The method of any preceding clause, further comprising configuring a user equipment (UE) with carrier aggregation.

6. The method of any preceding clause, wherein determining the PDCCH limit includes:
determining that the first cell can be scheduled by the second cell and a third cell;
replacing a first total number of configured downlink cells associated with a numerology by a summation of cells according to at least a parameter associated with a scheduling cell, a scheduled cell and the numerology of the scheduling cell; and replacing a second total number of configured downlink cells by a different summation of cells according to at least the parameter.

7. The method of any preceding clause, wherein the first summation of cells and the second summation of cells are across cell identifiers for downlink configured cells for the UE.

8. The method of any preceding clause, wherein the first cell corresponds to the scheduled cell scheduled by the second cell.

9. The method of any preceding clause, further comprising:
setting the parameter to zero when the first cell is not scheduled by the second cell or the numerology of the second cell is not the set numerology; and
setting the parameter to one when the first cell is only scheduled by the second cell with the set numerology.

10. The method of any preceding clause, further comprising determining the parameter based on one of:
a network configuration for each cell pair including the first cell and the second cell,
a UE report including a value of the parameter, or
a UE and network calculation.

11. The method of any preceding clause, wherein the UE and network calculation is based on a summation of a set of cells and the parameter as a product of a value of one for each scheduled cell.

12. The method of any preceding clause, wherein the UE and network calculation is based on the parameter corresponding to a proportional quantity of PDCCH configured for the scheduled cell and the scheduling cell.

13. The method of any preceding clause, wherein the third cell is the same cell as the first cell, the first cell is self-scheduled by itself and cross-carrier scheduled by the second cell.

14. The method of any preceding clause, wherein for each scheduled cell is scheduled by at most two cells, and no more than two values of the parameter are non-zero for the scheduled cell.

15. The method of any preceding clause, wherein a summation of the parameters associated with first cell and cells that schedule the first cell is equal to one for the first cell.

16. The method of any preceding clause, wherein for each cell scheduled by two cells, all non-zero values of the parameter are identical for cross-carrier scheduling and self-scheduling, respectively.

17. The method of any preceding clause, further comprising determining a non-zero value of the parameter for cross-carrier scheduling, wherein a non-zero value of the parameter for self-scheduling corresponds to a difference of one and the non-zero value of the parameter for cross-carrier scheduling.

18. The method of any preceding clause, further comprising reporting a PDCCH blind decode capability indication when a serving cell can be scheduled by multiple cells and a user equipment (UE) can be configured with one or more downlink cells such that a number of configured downlink cells equal to a summation of cells including one or more parameters each associated with a scheduling cell, a scheduled cell and the numerology of the scheduling cell is larger than a threshold value.

19. The method of any preceding clause, wherein a reference number of downlink cells is equal to a number of configured downlink cells equal to a summation of cells including a parameter associated with a scheduling cell, a scheduled cell and the numerology of the scheduling cell for cells configured to a user equipment (UE) when a PDCCH blind decode capability indication is not reported and any serving cell is scheduled by multiple cells.

20. The method of any preceding clause, wherein determining the PDCCH limit corresponding to at least one of a number of BDs and a number of CCEs includes determining a maximum number of BDs and CCEs for one or more PDCCH candidates received in a set of cells associated with a numerology factor.

21. The method of any preceding clause, wherein determining the PDCCH limit includes determining a maximum number of BDs and CCEs for a scheduled cell corresponding to the first cell that is monitored in a scheduling cell corresponding to the second cell and associated with a numerology factor based on a minimum and maximum number of PDCCH slots.

22. The method of any preceding clause, wherein determining the PDCCH limit corresponding to at least one of a number of BDs and a number of CCEs includes determining a combined maximum number of BDs and CCEs for one or more PDCCH candidates for the scheduled cell that is monitored in all scheduling cells having a similar numerology factor.

23. An apparatus for wireless communication, comprising:
    a transceiver;
    a memory configured to store instructions; and
    at least one processor communicatively coupled with the transceiver and the memory, wherein the at least one processors is configured to:
        determine a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell; and
        communicate one or more PDCCH transmissions for the first cell from the second cell and the at least a third cell based on the PDCCH limit.

24. The apparatus of clause 23, wherein the first cell corresponds to a scheduled cell, and wherein determining the PDCCH limit includes determining the PDCCH limit corresponding to the number of BDs and the CCEs in a slot of the second cell and a slot of the third cell.

25. The apparatus of any preceding clause, wherein to determine the PDCCH limit, the at least one processor is further configured to allocate, in one or more slots of the second cell and one or more corresponding slots of the third cell, a first subset of parts of the PDCCH limit to the PDCCH candidates for the first cell received in the second cell and a second subset of parts of the PDCCH limit to the PDCCH candidates for the first cell received in the third cell.

26. The apparatus of any preceding clause, wherein a sum of the first subset of parts and the second subset of parts equals one in the one or more slots of the second cell and the one or more corresponds slots of the third cell.

27. The apparatus of any preceding clause, wherein the at least one processor is further configured to configuring a user equipment (UE) with carrier aggregation.

28. The apparatus of any preceding clause, wherein the third cell is the same cell as the first cell, the first cell is self-scheduled by itself and cross-carrier scheduled by the second cell.

29. The apparatus of claim 23, wherein the at least one processor is further configured to report a PDCCH blind decode capability indication when a serving cell can be scheduled by multiple cells and a user equipment (UE) can be configured with one or more downlink cells such that a number of configured downlink cells equal to a summation of cells including one or more parameters each associated with a scheduling cell, a scheduled cell and a numerology of the scheduling cell is larger than a threshold value.

30. An apparatus for wireless communication, comprising:
    means for determining a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell; and
    means for communicating one or more PDCCH transmissions for the first cell from the second cell and the at least a third cell based on the PDCCH limit.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of"

indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
    identifying a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell, wherein identifying the PDCCH limit includes:
        identifying that the first cell can be scheduled by the second cell and a third cell;
        replacing a first total number of configured downlink cells associated with a numerology by a first summation of cells according to at least a parameter associated with a scheduling cell, a scheduled cell and the numerology of the scheduling cell; and
    communicating at least one PDCCH transmission for the first cell from the second cell and the at least a third cell based on the PDCCH limit.

2. The method of claim 1, wherein the first cell corresponds to scheduled cell, and wherein identifying the PDCCH limit includes determining the PDCCH limit corresponding to the number of BDs and the CCEs in a slot of the second cell and a slot of the third cell.

3. The method of claim 1, wherein identifying the PDCCH limit includes allocating, in one or more slots of the second cell and one or more slots of the third cell, a first subset of parts of the PDCCH limit to the PDCCH candidates for the first cell received in the second cell and a second subset of parts of the PDCCH limit to the PDCCH candidates for the first cell received in the third cell.

4. The method of claim 3, wherein a sum of the first subset of parts and the second subset of parts equals one in the one or more slots of the second cell and the one or more corresponds slots of the third cell.

5. The method of claim 1, further comprising configuring a user equipment (UE) with carrier aggregation.

6. The method of claim 1, wherein determining the PDCCH limit includes:
    replacing a second total number of configured downlink cells by a second summation of cells according to at least the parameter.

7. The method of claim 6, wherein the first summation of cells and the second summation of cells are across cell identifiers for downlink configured cells for the UE.

8. The method of claim 1, wherein the first cell corresponds to the scheduled cell scheduled by the second cell.

9. The method of claim 8, further comprising:
    setting the parameter to zero when the first cell is not scheduled by the second cell or a numerology of the second cell is not the set numerology; and
    setting the parameter to one when the first cell is only scheduled by the second cell with the set numerology.

10. The method of claim 1, further comprising determining the parameter based on one of:
    a network configuration for each cell pair including the first cell and the second cell,
    a UE report including a value of the parameter, or
    a UE and network calculation.

11. The method of claim 1, wherein the UE and network calculation is based on a summation of a set of cells and the parameter as a product of a value of one for each scheduled cell.

12. The method of claim 10, wherein the UE and network calculation is based on the parameter corresponding to a proportional quantity of PDCCH configured for the scheduled cell and the scheduling cell.

13. The method of claim 1, wherein the third cell corresponds to the first cell, and wherein the first cell is self-scheduled and cross-carrier scheduled by the second cell.

14. The method of claim 1, wherein each scheduled cell is scheduled by at most two cells, and no more than two values of the parameter are non-zero for the scheduled cell.

15. The method of claim 14, wherein a summation of multiple parameters associated with the first cell and cells that schedule the first cell is equal to one for the first cell.

16. The method of claim 1, wherein for each cell scheduled by two cells, all non-zero values of the parameter are identical for cross-carrier scheduling and self-scheduling, respectively.

17. The method of claim 1, further comprising determining a non-zero value of the parameter for cross-carrier scheduling, wherein a non-zero value of the parameter for self-scheduling corresponds to a difference of one and the non-zero value of the parameter for cross-carrier scheduling.

18. The method of claim 1, further comprising reporting a PDCCH blind decode capability indication when a serving cell can be scheduled by multiple cells and a user equipment (UE) can be configured with one or more downlink cells such that a number of configured downlink cells equal to a summation of cells including one or more parameters each associated with a scheduling cell, a scheduled cell and a numerology of the scheduling cell is larger than a threshold value.

19. The method of claim 1, wherein a reference number of downlink cells is equal to a number of configured downlink cells equal to a summation of cells including a parameter associated with a scheduling cell, a scheduled cell and a numerology of the scheduling cell for cells configured to a user equipment (UE) when a PDCCH blind decode capability indication is not reported and any serving cell is scheduled by multiple cells.

20. The method of claim 1, wherein identifying the PDCCH limit corresponding to at least one of a number of BDs and a number of CCEs includes determining a maximum number of BDs and CCEs for one or more PDCCH candidates received in a set of cells associated with a numerology factor.

21. The method of claim 1, wherein identifying the PDCCH limit includes determining a maximum number of BDs and CCEs for a scheduled cell corresponding to the first cell that is monitored in a scheduling cell corresponding to the second cell and associated with a numerology factor based on a minimum and maximum number of PDCCH slots.

22. The method of claim 1, wherein identifying the PDCCH limit corresponding to at least one of a number of BDs and a number of CCEs includes determining a combined maximum number of BDs and CCEs for one or more PDCCH candidates for the scheduled cell that is monitored in all scheduling cells having a similar numerology factor.

23. An apparatus for wireless communication, comprising:
a transceiver;
a memory configured to store instructions; and
at least one processor communicatively coupled with the transceiver and the memory, wherein the at least one processor is configured to:
identify a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell, wherein to identify the PDCCH limit, the at least one processor is further configured to:
identify that the first cell can be scheduled by the second cell and a third cell;
replace a first total number of configured downlink cells associated with a numerology by a summation of cells according to at least a parameter associated with a scheduling cell, a scheduled cell and the numerology of the scheduling cell; and
communicate at least one PDCCH transmission for the first cell from the second cell and the at least a third cell based on the PDCCH limit.

24. The apparatus of claim 23, wherein the first cell corresponds to scheduled cell, and wherein to identify the PDCCH limit, wherein the at least one processor is further configured to determine the PDCCH limit corresponding to the number of BDs and the CCEs in a slot of the second cell and a slot of the third cell.

25. The apparatus of claim 23, wherein to identify the PDCCH limit, the at least one processor is further configured to allocate, in one or more slots of the second cell and one or more corresponding slots of the third cell, a first subset of parts of the PDCCH limit to the PDCCH candidates for the first cell received in the second cell and a second subset of parts of the PDCCH limit to the PDCCH candidates for the first cell received in the third cell.

26. The apparatus of claim 25, wherein a sum of the first subset of parts and the second subset of parts equals one in the one or more slots of the second cell and the one or more corresponds slots of the third cell.

27. The apparatus of claim 23, wherein the at least one processor is further configured to configure a user equipment (UE) with carrier aggregation.

28. The apparatus of claim 23, wherein the third cell corresponds to the first cell, and wherein the first cell is self-scheduled and cross-carrier scheduled by the second cell.

29. The apparatus of claim 23, wherein the at least one processor is further configured to report a PDCCH blind decode capability indication when a serving cell can be scheduled by multiple cells and a user equipment (UE) can be configured with one or more downlink cells such that a number of configured downlink cells equal to a summation of cells including one or more parameters each associated with a scheduling cell, a scheduled cell and a numerology of the scheduling cell is larger than a threshold value.

30. An apparatus for wireless communication, comprising:
means for identifying a physical downlink control channel (PDCCH) limit corresponding to at least one of a number of blind detections (BDs) and a number of control channel elements (CCEs) based on one or more PDCCH candidates for a first cell that are monitored in a second cell or one or more PDCCH candidates for the first cell that are monitored in the at least a third cell, wherein the first cell is scheduled by the second cell and the at least a third cell different from the second cell, wherein determining the PDCCH limit includes:
means for identifying that the first cell can be scheduled by the second cell and a third cell; and
means for replacing a first total number of configured downlink cells associated with a numerology by a first summation of cells according to at least a parameter associated with a scheduling cell, a scheduled cell and the numerology of the scheduling cell; and
means for communicating at least one PDCCH transmission for the first cell from the second cell and the at least a third cell based on the PDCCH limit.

* * * * *